United States Patent [19]

Grünwald

[11] Patent Number: 4,527,427
[45] Date of Patent: Jul. 9, 1985

[54] DEVICE FOR DETERMINING THE FLOW RATE OF A FLOWING MEDIUM

[75] Inventor: Werner Grünwald, Gerlingen, Fed. Rep. of Germany

[73] Assignee: Robert Bosch GmbH, Stuttgart, Fed. Rep. of Germany

[21] Appl. No.: 552,893

[22] Filed: Nov. 17, 1983

[30] Foreign Application Priority Data

Feb. 12, 1983 [DE] Fed. Rep. of Germany ....... 3304902

[51] Int. Cl.³ .............................................. G01F 1/68
[52] U.S. Cl. .................................................. 73/204
[58] Field of Search .................................. 73/118, 204

[56] References Cited

U.S. PATENT DOCUMENTS 3,604,261 9/1971 Olin ...................................... 73/204
3,942,378 3/1976 Olmstead ............................ 73/204
4,043,196 8/1977 Trageser ............................. 73/204
4,214,478 7/1980 Lauterbach ........................ 73/204

Primary Examiner—Herbert Goldstein
Attorney, Agent, or Firm—Edwin E. Greigg

[57] ABSTRACT

A device is proposed for determining the flow rate of a flowing medium, in particular the flow rate of air aspirated by an internal combustion engine which includes at least two temperature-dependent measuring resistors which are exposed to the flowing medium, each disposed in a separate bridge circuit, heated to different temperatures and regulated such as to be constant. The measuring resistors as well as the other bridge resistors are embodied as film resistors and are disposed opposite one another, each on a different side of a substrate. One signal per bridge, dependent on the currents flowing through the bridges, is supplied to a signal processing unit, the output variable of which represents a standard for the flow rate of the flowing medium that is independent of the temperature of the flowing medium.

2 Claims, 2 Drawing Figures

DEVICE FOR DETERMINING THE FLOW RATE OF A FLOWING MEDIUM

BACKGROUND OF THE INVENTION

The invention is based on a device as generally defined hereinafter. A device for determining the flow rate of a flowing medium is already known in which to improve its sensitivity, one temperature-dependent measuring resistor is disposed in each separate bridge circuit and is heated and regulated to a constant temperature.

OBJECT AND SUMMARY OF THE INVENTION

The device according to the invention has the advantage over the prior art in that the measuring resistors, embodied as film resistors, are disposed opposite one another, each on a different side of a substrate, and thus thermally coupled, resulting in a device for determining the flow rate which performs measurements rapidly and independently of the ambient temperature.

Additionally, the device according to the invention is quite small in size yet quite sturdy.

The invention will be better understood and further objects and advantages thereof will become apparent from the ensuing detailed description of a preferrred embodiment taken in conjunction with the drawings.

DESCRIPTION OF THE PREFERRED EMBODIMENT

Figure 1:
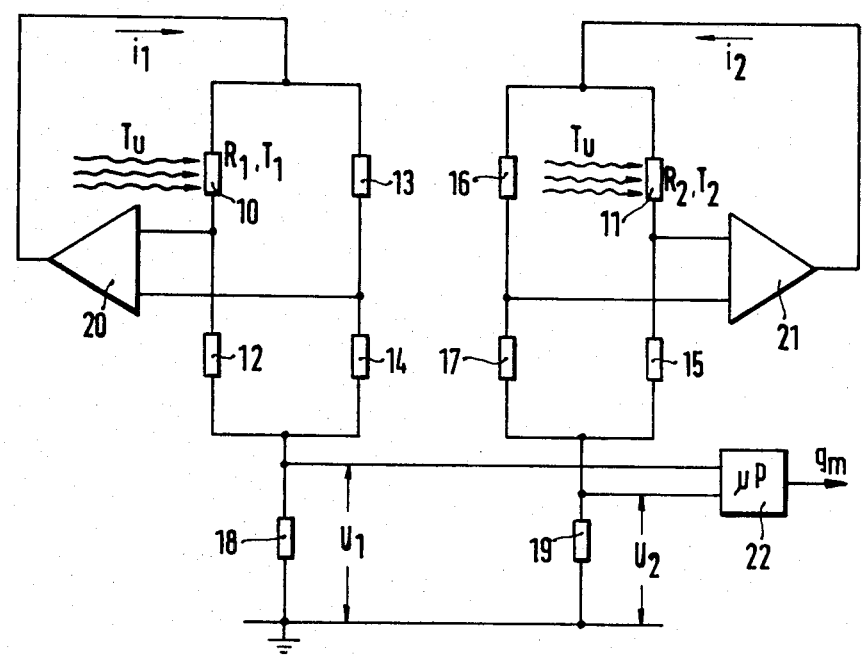
FIG. 1 is a circuit diagram for a device for determining the flow rate of a flowing medium.

In FIG. 1, the temperature-dependent measuring resistors $R_1$ and $R_2$, which are heated up to different but constant temperatures $T_1$ and $T_2$, are identified as 10 and 11. These measuring resistors 10 and 11 are embodied as film resistors and are each one component of a bridge circuit, each bridge circuit being completed by three further film resistors not dependent on temperature. The bridge branches of the two identically structured individual bridges of the double bridge arrangement are embodied by the series circuits of the resistors 10 and 12, 13 and 14, 11 and 15, and 16 and 17, respectively. The bases of the bridges, that is, the junctions of the resistors 12 and 14 and resistors 17 and 15, respectively, are connected to ground potential via the resistors 18 and 19, respectively. The output of a regulator 20 or 21, respectively, is connected with the resistors 10 and 13 or 16 and 11, respectively. These regulators 20 and 21, which in the exemplary embodiment are designed as differential amplifiers, are supplied at their inputs with the bridge diagonal voltage in the form of a potential difference between the junctions of the resistors 10, 12 and 13, 14 or the resistors 16, 17 and 11, 15, respectively. The device is completed by a microprocessor 22 acting as a signal processing unit, to which the voltage drop over the resistors 18 and 19 is delivered as an input variable, and the output variable of which assumes a value proportional to the flow rate qm of the flowing medium.

The mode of operation of this device is as follows:

As a result of the electrical currents $i_1$ and $i_2$ flowing into the two bridges, the temperature-dependent measuring resistors 10 and 11 introduced into the flowing medium are heated up to temperatures $T_1$ and $T_2$, respectively. In a state of balance, the currents $i_1$ and $i_2$, respectively, are established in such a manner that the bridge diagonal voltage assumes the value of zero. It the air mass, or flow rate, of the flowing medium per unit of time changes, then the bridge becomes imbalanced until the regulator 20 or 21 changes the bridge currents $i_1$, $i_2$ to values such that the measuring resistors 10, 11 again have the temperatures $T_1$, $T_2$. This regulating process also takes place if the mass of the flowing medium per unit of time remains constant but the temperature $T_u$ of the flowing medium changes. The variables $U_1$, $U_2$ supplied to the microprocessor 22, which represent a standard for the total currents $i_1$, $i_2$ flowing through the two bridges, thus vary as a function of the mass per unit of time and of the temperature $T_u$ of the flowing medium.

Figure 2:
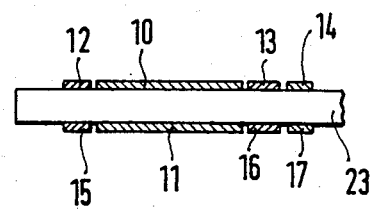
FIG. 2 shows a substrate and the disposition of the various bridge resistors of the device.

FIG. 2 shows the disposition according to the invention of the resistors, embodied as film resistors, of each individual bridge 10, 12, 13, 14 and 11, 15, 16, 17 on a substrate 23. The resistors of each individual bridge are each disposed on a different side of the substrate 23 and the measuring resistors 10, 11 are thus thermally coupled with one another by means of the substrate 23. The substrate 23, with the bridge resistors disposed on it, may be disposed in the air flow aspirated by an internal combustion engine, for instance in the air intake tube of the engine, so that the aspirated air throughput can be detected. The following calculation is intended to show that the influence of the temperature of the flowing medium can be eliminated, when the described device is used, by means of simple arithmetic manipulation of the values of the two bridge currents:

With the following variables:

$T_i$ = the temperature of the temperature-dependent resistors 10, 11;
$i_i$ = the bridge currents;
$q_m$ = throughput mass or flow rate;
d = thickness of the substrate;
$\lambda$ = the heat conductivity; and
k = a constant, the heat balance of the measuring resistor $R_1$ can be expressed in a good approximation as $$i_1^2 \cdot R_1 \approx \lambda/d \cdot (T_1 - T_2) + k \cdot (T_1 - T_u) \cdot \sqrt{q_m}$$

and that of the measuring resistor $R_2$ as $$i_2^2 \cdot R_2 \approx -\lambda/d \cdot (T_1 - T_2) + k \cdot (T_2 - T_u) \cdot \sqrt{q_m}$$

From these two equations, if the ambient temperature $T_u$ is eliminated the throughput or flow rate $q_m$ becomes $$q_m = \left( \frac{R_1 \cdot i_1^2 - R_2 \cdot i_2^2}{k \cdot (T_1 - T_2)} - \frac{2\lambda}{d} \right)^2$$

By suitably processing the bridge currents, or the voltages $U_1$, $U_2$ proportional to them, for instance with the microprocessor 22, to which the constant values $\lambda$ and d are also specified, a determination of the flow rate of the flowing medium can thus be performed regardless of the temperature $T_u$ of the flowing medium.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. In a device for determining the flow rate of a flowing medium aspirated by an internal combustion engine, having at least two temperature-dependent measuring resistors exposed to said flowing medium, each disposed in a bridge circuit, heated to different temperatures, and regulated such as to be constant via a regulating means, and in which one signal per bridge, dependent on the currents flowing through said bridges, is supplied to a signal processing unit, the output variable of which represents a standard for said flow rate of the medium that is independent of the temperature of the flowing medium, characterized in that said two temperature-dependent measuring resistors comprise film resistors disposed opposite one another, each on a different side of a substrate member.

2. A device as defined by claim 1, wherein the remaining resistors of one of said bridge circuits comprise film resistors disposed on one side of said substrate.

* * * * *